(12) United States Patent
Theis

(10) Patent No.: US 8,196,391 B2
(45) Date of Patent: Jun. 12, 2012

(54) SCR EMISSIONS-CONTROL SYSTEM

(75) Inventor: Joseph Robert Theis, Rockwood, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 684 days.

(21) Appl. No.: 12/326,820

(22) Filed: Dec. 2, 2008

(65) Prior Publication Data

US 2010/0132335 A1 Jun. 3, 2010

(51) Int. Cl.
*F01N 3/00* (2006.01)
(52) U.S. Cl. .......................................... 60/286
(58) Field of Classification Search .................... 60/285, 60/286
See application file for complete search history.

(56) References Cited

U.S. PATENT DOCUMENTS

| | | | | |
|---|---|---|---|---|
| 5,483,795 A * | 1/1996 | Katoh et al. | | 60/276 |
| 6,732,507 B1 * | 5/2004 | Stanglmaier et al. | | 60/285 |
| 2003/0140621 A1 | 7/2003 | Khair et al. | | |
| 2004/0031261 A1 * | 2/2004 | Sun et al. | | 60/277 |
| 2004/0168431 A1 * | 9/2004 | Goralski et al. | | 60/286 |
| 2004/0237512 A1 * | 12/2004 | Tang et al. | | 60/295 |
| 2006/0254258 A1 * | 11/2006 | Blakeman et al. | | 60/286 |
| 2006/0260297 A1 | 11/2006 | Koch | | |
| 2006/0277898 A1 * | 12/2006 | McCarthy | | 60/286 |
| 2006/0283172 A1 * | 12/2006 | Leone et al. | | 60/274 |
| 2007/0028601 A1 * | 2/2007 | Duvinage et al. | | 60/286 |
| 2007/0028602 A1 * | 2/2007 | Dalla Betta et al. | | 60/286 |
| 2007/0033928 A1 * | 2/2007 | Hu et al. | | 60/286 |
| 2007/0062179 A1 * | 3/2007 | Leone | | 60/285 |
| 2007/0144144 A1 * | 6/2007 | Yokoyama et al. | | 60/277 |
| 2007/0144152 A1 * | 6/2007 | Lueders | | 60/286 |
| 2007/0209351 A1 | 9/2007 | Chimner et al. | | |
| 2007/0256407 A1 | 11/2007 | Reuter | | |
| 2007/0271908 A1 | 11/2007 | Hemingway et al. | | |

FOREIGN PATENT DOCUMENTS

GB 2424197 A * 9/2006

* cited by examiner

*Primary Examiner* — Thomas Denion
*Assistant Examiner* — Jason Shanske
(74) *Attorney, Agent, or Firm* — Julia Voutyras; Alleman Hall McCoy Russell & Tuttle LLP

(57) ABSTRACT

An emissions-control system of a vehicle is provided, having an SCR device disposed downstream of an LNT in the exhaust. During an enrichment interval to purge the LNG, a duration of an enrichment subinterval beginning after a sensor indicates rich breakthrough is adjusted in response to an aging of the LNT. In this way, it is possible to modify LNT regeneration based on catalyst performance and thereby generate sufficient ammonia for improved operation of the SCR device.

5 Claims, 5 Drawing Sheets

US 8,196,391 B2

SCR EMISSIONS-CONTROL SYSTEM

TECHNICAL FIELD

The present application relates to the field of emissions control in motor vehicles, and more particularly, to control of nitrogen-oxide emissions from lean-burn engines.

BACKGROUND AND SUMMARY

A vehicle may be equipped with a lean-burn gasoline or diesel engine, or an engine configured to consume an alternative fuel (alcohol, biodiesel, etc.) under lean conditions. An exhaust system in the vehicle may include a lean nitrogen-oxide trap (LNT), configured to sequester nitrogen oxides ($NO_x$) from the exhaust stream during lean operation. The exhaust system may also include a selective catalytic reduction (SCR) device, configured to catalyze the reduction of $NO_x$ to dinitrogen via nitrogen-containing reducing agents (e.g. ammonia) entrained in the exhaust stream during lean operation.

The capacity of the LNT for continued sequestration of $NO_x$ may be intermittently restored via a regenerative enrichment phase, wherein the engine is temporarily induced to providing rich (i.e., reducing) exhaust. In some configurations, the LNT and the SCR device may be disposed so that ammonia released from the LNT during the enrichment phase flows to the SCR device to reduce $NO_x$ therein. In addition, some ammonia released from the LNT during the enrichment phase may be stored in the SCR catalyst and used during lean periods to reduce $NO_x$ that may slip past the LNT.

Further, the engine may be operatively coupled to a controller. The controller may be configured to initiate the regeneration phase by temporarily causing the engine to provide rich exhaust. In some examples, the controller may be further configured to stop the regeneration phase after a predetermined interval, by restoring the engine to lean operating conditions. In other examples, the controller may stop the regeneration phase pursuant to a sensor response.

For example, U.S. Patent Application Publication Number 2007/0033928 describes an LNT/SCR system for a vehicle, in which a sensor is disposed downstream of the LNT and upstream of the SCR device. The reference further describes, in one specific example, that an enrichment phase of the LNT/SCR system may be stopped when a sensor response related to ammonia concentration peaks and then falls below a target value.

The inventor herein has recognized a potential inadequacy, however, in the approaches described above. Specifically, as the LNT catalyst ages, the amount of ammonia provided to the SCR device during the regeneration phase may be insufficient.

Therefore, the inventor has provided, in one embodiment, an emissions-control system of a vehicle that comprises an LNT disposed in an exhaust system of the vehicle, downstream of the engine, an SCR device disposed downstream of the LNT, and a controller. The controller is operatively coupled to the engine and configured to cause the engine to provide a reducing exhaust to the LNT at least during an enrichment interval, the enrichment interval including an enrichment subinterval, the controller further configured to adjust the enrichment subinterval in response to an ageing of the LNT. In one example, the enrichment interval may include a first enrichment subinterval commencing before rich breakthrough occurs in the LNT and ending before a second enrichment subinterval. The second enrichment subinterval commences after rich breakthrough occurs in the LNT and ends when the enrichment interval ends. Of course, these intervals may be varied and also additional enrichment subintervals may further be included, if desired.

In this way, it is possible to modify LNT regeneration based on catalyst performance and thereby generate sufficient ammonia for improved operation of the SCR device. Other embodiments provide additional emission-control systems and related methods to supply ammonia to an SCR device disposed downstream of an LNT in an exhaust system of a vehicle.

It will be understood that the summary above is provided to introduce in simplified form a selection of concepts that are further described in the detailed description. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
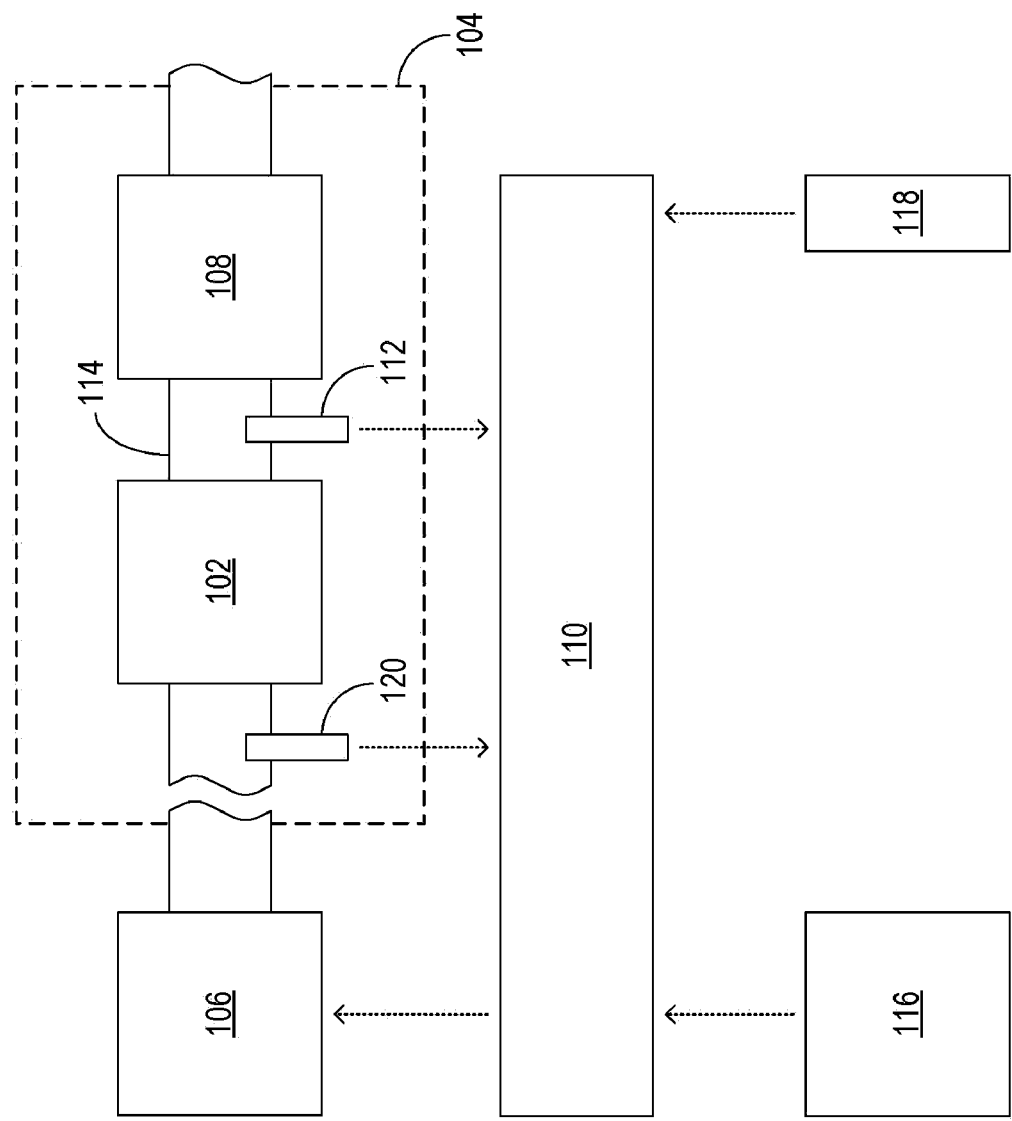
FIG. 1 represents an example emissions-control system of a vehicle, in accordance with the present disclosure.

FIG. 1 represents an emissions-control system of a vehicle in one, example embodiment. The emissions-control system includes LNT 102 disposed in exhaust system 104 of the vehicle, downstream of engine 106. The LNT may be any device comprising a catalyst, configured to trap $NO_x$ from lean engine exhaust, and further configured to reduce the trapped $NO_x$ to ammonia and/or dinitrogen when the engine exhaust is made rich. In some embodiments, the LNT may further comprise one or more oxygen-storage materials (e.g., ceria), which store oxygen during lean periods and release the oxygen during the enrichment periods. It will be understood that a 'lean engine exhaust' is one that is deficient in reducing species (e.g., hydrocarbons, dihydrogen, carbon monoxide, etc.) and/or enriched in dioxygen, relative to the stoichiometric state. Conversely, a 'rich engine exhaust,' is one that is enriched in reducing species and/or deficient in dioxygen, relative to the stoichiometric state.

Continuing in FIG. 1, the illustrated emissions-control system further includes SCR device 108, also disposed in the exhaust system of the vehicle, downstream of the LNT. The SCR device may be any device comprising a catalyst and configured to reduce $NO_x$ to dinitrogen under lean conditions when certain nitrogen-containing reducing agents (e.g., ammonia, urea, etc.) are provided in the exhaust stream.

Although LNT 102 and SCR device 108 are shown in FIG. 1 as separate, discrete devices, it will be understood that one or both may be included (e.g., integrated) into a multifunctional, emissions-control component. Further, it will be understood that some emissions-control systems fully consistent with this embodiment may include other emissions-control components not shown in the drawing—three way catalyst devices, diesel oxidation catalyst devices, diesel particulate filters, sensors, etc.—disposed according to various configurations in exhaust system 104. For example, a diesel oxidation catalyst device may be disposed upstream of the LNT, and a diesel particulate filter may be disposed downstream of the SCR device.

To achieve advantageous emissions-control performance from the illustrated configuration, an adequate supply of ammonia must be provided to SCR device 108 from LNT 102 during enrichment phases. To maintain fuel economy, however, the enrichment phases must be kept as short as possible. Therefore, the emissions-control system of FIG. 1 also includes controller 110. The controller may be operatively coupled to engine 106 and configured to cause the engine to provide a reducing exhaust to the LNT at least during an enrichment interval, the enrichment interval including a plurality of enrichment subintervals, one of which occurring in response to an output change of an exhaust stream sensor (as described below). The controller may be further configured to adjust this enrichment subinterval in response to an ageing of the LNT, as described herein. Although controller 110 is shown in the drawing as a discrete, self-contained component, it will be understood that the controller may be part of one or more other control components of the vehicle. The controller may further be configured to adjust a level of enrichment (e.g., an exhaust-stream air to fuel ratio) during one or more enrichment subintervals, also in response to an ageing of the LNT.

Continuing in FIG. 1, the illustrated emissions-control system also includes sensor 112 disposed within exhaust system 104. Sensor 112 may be any sensor responsive to a component of the engine exhaust (e.g., dioxygen, dihydrogen, ammonia, water vapor, $NO_x$, etc.) or to a property of the engine exhaust (e.g., a reductive and/or oxidative capacity). In some embodiments, the sensor may be responsive at least to a partial pressure of dioxygen in the exhaust system, in a locality of the sensor: it may be an oxygen sensor or an air-fuel ratio sensor, for example. In some embodiments, the sensor may be a HEGO sensor, and in other embodiments, it may be a UEGO sensor. The sensor may be configured to report when an exhaust-stream air-fuel ratio traverses a threshold—for example, a threshold corresponding to a rich air-fuel ratio. In FIG. 1, sensor 112 is disposed in exhaust conduit 114, downstream of LNT 102 and upstream of SCR device 108. Disposed at this location, the sensor may respond to a richness of the exhaust stream downstream of the LNT, but upstream of the SCR device.

Figure 2A:
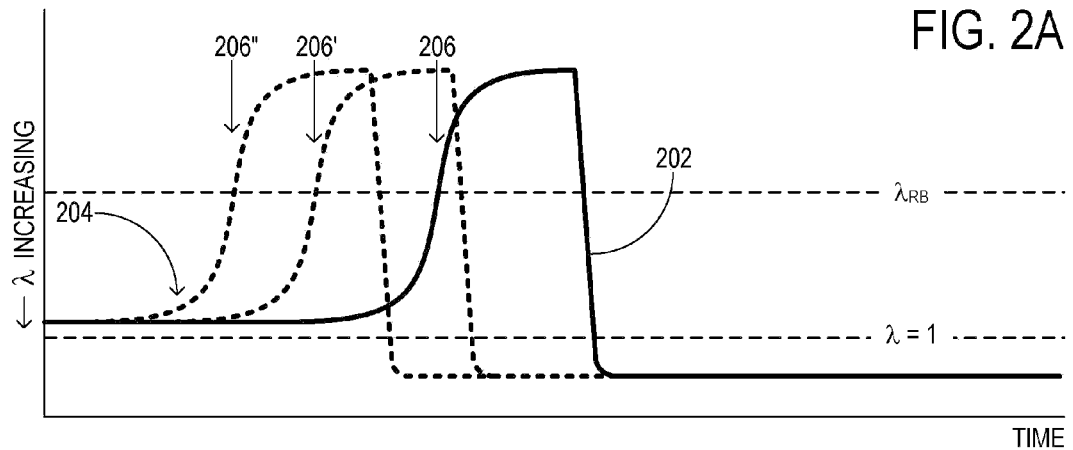
FIGS. 2A, 2B, and 2C illustrate idealized, time-dependent sensor responses in accordance with embodiments of the present disclosure.
Figure 2B:
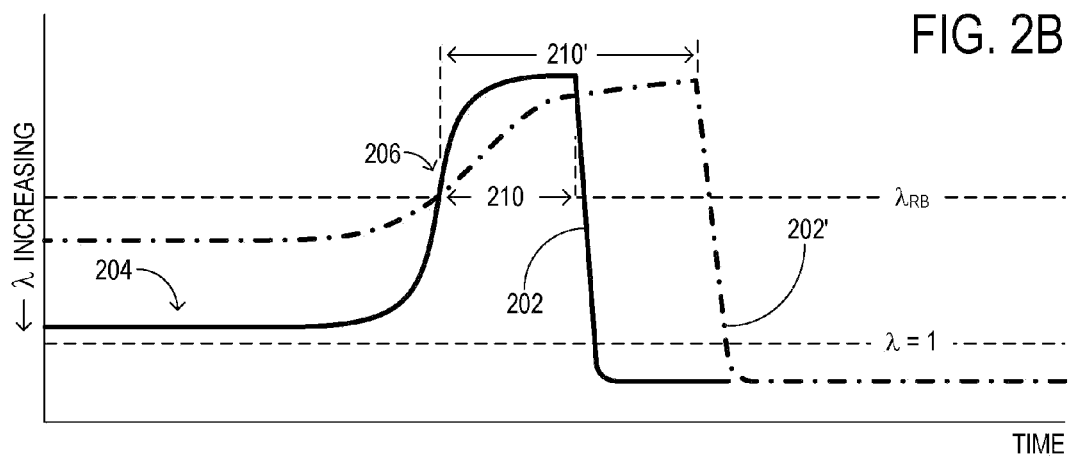

The curves plotted in FIGS. 2A and 2B represent idealized, time-dependent responses of sensor 112 during example enrichment phases of the illustrated emissions-control system, where the sensor is configured to report an air-fuel ratio, and is disposed in accordance with FIG. 1. In each graph, an exhaust-stream air-fuel ratio $\lambda$ is plotted against time into the enrichment phase (i.e., time after enrichment begins). Note that the graphs are scaled, both horizontally and vertically, for ease of illustration rather than quantitative accuracy. As such, the graphs are provided without units and scaled in a manner that may or may not be linear in the quantities being plotted.

During an enrichment phase, rich engine exhaust may effect a gradual reduction of trapped $NO_x$ and/or other oxidizing species within LNT 102. As the trapped oxidizing species are reduced, sensor 112 may report a near-stoichiometric condition, because much of the reducing capacity of the exhaust stream is being consumed by the oxidizing species trapped in the LNT. The response of sensor 112 under these conditions is represented by solid curve 202 in region 204. During this stage, ammonia formed transiently by reduction of $NO_x$ in an upstream region of the LNT may undergo further reaction in a downstream region of the LNT—reacting with $NO_x$ and/or oxygen, for example, so that little or no ammonia may be released from the LNT.

At some point, however, a substantial portion of the stored $NO_x$ and/or other oxidizing species will be depleted from LNT 102, allowing the exhaust stream to retain its reducing capacity. Sensor 112 will then report an increasing richness. In particular, the sensor response may traverse a threshold $\lambda_{RB}$, which may correspond to a rich air-fuel ratio. This event, shown at 206 in FIGS. 2A and 2B, is called 'rich breakthrough.' It may indicate, in principle, that the capacity of the LNT for continued $NO_x$ trapping has been restored, and that the enrichment phase may therefore be stopped.

Within the SCR device, ammonia released from the LNT may react with $NO_x$—also released from the LNT—to form dinitrogen and water. Stoichiometric reduction of $NO_x$ by ammonia may be promoted by dioxygen as a co-oxidant; by inference, an oxygen-storing capacity of the SCR catalyst may enhance the ability of the SCR device to reduce $NO_x$ during the enrichment phase, where very little dioxygen is provided in the exhaust stream. In addition, some ammonia not used to reduce $NO_x$ during the enrichment phase may be stored on the SCR catalyst and used during the next lean period to reduce $NO_x$ that slips past the LNT. Therefore, the illustrated LNT/SCR combination may achieve the combined advantages of further reducing $NO_x$ emissions (below the level that would be achieved with the LNT alone) and limiting undesired release of ammonia (i.e., ammonia slip) from the exhaust system.

The time when rich breakthrough occurs may depend on how much $NO_x$ and/or other oxidizing species were trapped in LNT 102 prior to the enrichment phase. Thus, the dashed curves in FIG. 2A show rich breakthrough occurring at earlier times 206' and 206", where less $NO_x$, for example, may have been trapped in the LNT. The time when rich breakthrough occurs may further depend on a temperature and/or flow rate in the exhaust stream. Further, as described hereinafter, the appropriate duration of the enrichment phase beyond the point where rich breakthrough occurs may depend on a degree of ageing of the LNT.

For example, a response resembling solid curve 202 may be observed for an LNT that is new and at top efficiency. When LNT 102 is in such condition, reducing species in the rich engine exhaust may reduce trapped $NO_x$ and/or other oxidizing species at a mass-transport limited rate (i.e., as fast as the exhaust can flow into the LNT). Therefore, by the time the rich exhaust front has reached sensor 112, substantially all of the trapped $NO_x$ may have been reduced. Under such conditions, enrichment of the exhaust stream should be stopped when sensor 112 reports rich breakthrough, or even before, as rich exhaust may be available upstream of the sensor in sufficient quantity to complete the reduction (vide infra).

However, when LNT 102 is aged and has decreased in efficiency, reducing species in the rich engine exhaust may react more slowly with the trapped $NO_x$, such that a significant amount of rich exhaust slips through the LNT before reduction is complete. One contributor to loss of LNT efficiency with age may be a gradual segregation of the precious-metal catalyst (e.g., platinum, palladium, etc.) away from the $NO_x$-storage material (e.g., barium oxide, ceria, etc.). Migration of the catalyst away from the $NO_x$-storage material may, by inference, increase the time required for substantially all of the trapped NO$_x$ to be released as dinitrogen or ammonia under enrichment conditions. Therefore, a response resembling dot-dashed curve 202' may be observed for a more significantly aged, less efficient LNT. Under these conditions, it may be advantageous to continue enrichment for some time after sensor 112 reports rich breakthrough, to ensure that the capacity of the LNT has been fully restored and to generate sufficient NH$_3$ for the SCR catalyst. This can be accomplished by extending the enrichment phase through one or more enrichment subintervals and/or by increasing the level of enrichment, as described hereinafter.

Controller 110 may be configured to provide an enrichment phase comprising one or more enrichment subintervals in which a rich engine exhaust is provided to the LNT. The controller may be further configured to adjust any enrichment subinterval in response to a sensor output, a temperature, and/or other parameters, and further in response to an aging of the LNT. For example, there may be a first enrichment subinterval that is governed primarily by the sensor, and corresponds to the reduction of stored NO$_x$ and stored oxygen. In this example, the first enrichment subinterval may extend from the start of the enrichment phase until the time when rich-breakthrough is detected. Therefore, the first enrichment subinterval may be lengthened as the amount of stored NO$_x$ increases. As the LNT ages, the first enrichment subinterval may remain the same or even shorten in duration relative to a previous enrichment subinterval; note that as the LNT ages, less NO$_x$, may be stored in a lean periods prior to enrichment. In addition, a second enrichment subinterval may determine how long the richness is maintained after the first enrichment subinterval. This may include, in some examples, lengthening the second enrichment subinterval with increased LNT aging—a change opposite to that of the first enrichment subinterval, in some cases. The level of enrichment during the second enrichment subinterval can also be increased as the catalyst ages.

The balance of this disclosure focuses on controlling a latter part of the enrichment phase commencing, for example, after rich breakthrough from LNT 102 is detected. This period of time is referred to hereinafter simply as 'the enrichment subinterval.' It will be understood, however, that referring to it as such does not preclude the involvement of other, prior enrichment subintervals within the enrichment phase.

By appropriate configuration of controller 110, various aspects of the enrichment subinterval may be adjusted in response to LNT ageing. For example, a start and/or a duration of the enrichment subinterval may be adjusted in response to LNT ageing: the enrichment subinterval may be lengthened as the LNT ages, a start time of the enrichment subinterval may be retarded as the LNT ages, etc. Further, the enrichment subinterval may be adjusted in response to LNT ageing by operative coupling of the controller to other vehicle components—sensors, odometers, etc.—or in any other suitable manner.

FIG. 2B shows enrichment subinterval 210, which controller 110 may be configured to provide when the LNT is new and at top efficiency. FIG. 2B also shows enrichment subinterval 210', which controller 110 may be configured to provide when the LNT is more significantly aged. In this example, both enrichment subintervals begin at 206, when sensor 112 reports rich breakthrough.

Figure 2C:
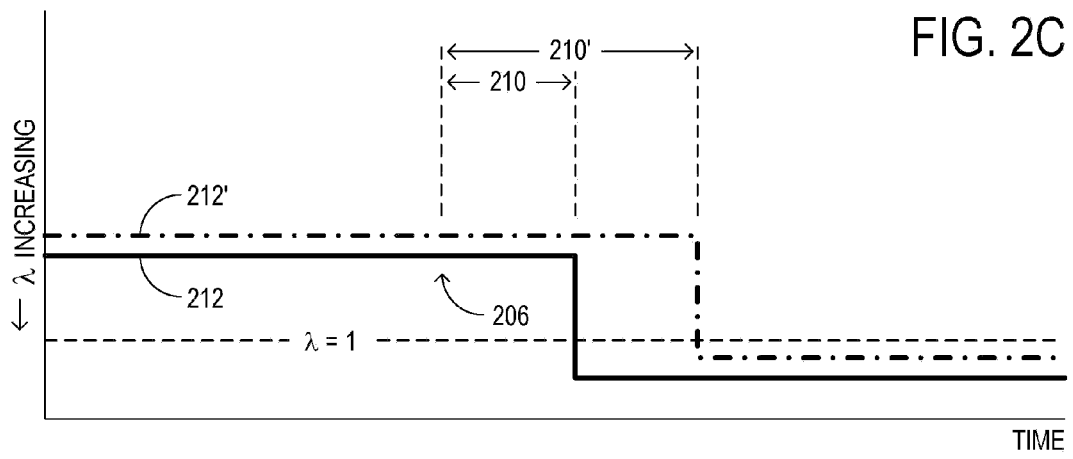

The sensor responses plotted in FIG. 2C are analogous to those plotted in FIG. 2B, but correspond to a hypothetical configuration in which sensor 112 has been moved upstream of LNT 102. Thus, the graphs show a hypothetical air-fuel ratio of an exhaust gas provided to the LNT during two different enrichment phases: enrichment phase 212, which controller 110 may provide when the LNT is new and at top efficiency, and enrichment phase 212', which controller 110 may provide when the LNT is more significantly aged. FIG. 2C also shows enrichment subintervals 210 and 210', each starting at 206, when sensor 112 reports rich breakthrough. For clarity, the enrichment phases in FIG. 2C are shown vertically offset from each other. It will be understood, however, that the hypothetical sensor responses represented in the graph may share the same lean and rich levels, or in other embodiments, may attain different lean and rich levels.

In FIGS. 2A, 2B, and 2C, an independent 'time' coordinate is plotted dimensionlessly on the horizontal axes as a metric for extension into the enrichment phase. Likewise, 'time' and related terms 'time interval', 'start time', 'ageing', etc. are used throughout the present disclosure. It will be understood, however, that other suitable metrics—number of engine revolutions, number of combustion events or rich combustion events, mass flow of exhaust, etc.—are contemplated as surrogate or alternative metrics. Moreover, configurations and methods defined according to such metrics are fully consistent with the present disclosure. Thus, in one contemplated embodiment, controller 110 may be configured to provide an adjustable number of rich combustion events after sensor 112 has indicated rich breakthrough, wherein the adjustable number is responsive to an accumulated mass flow of exhaust through LNT 102. Further, since no axis scale is included in graphs of FIGS. 2A, 2B, and 2C, it will be understood that a plurality of different axis scales may be used, depending on particular exhaust-system parameters, sensor configurations, etc.

Returning now to FIG. 1, controller 110 is shown operatively coupled to mileage-responsive component 116, and configured to receive an output therefrom. Mileage-responsive component 116 may be any component of the vehicle that is responsive to an accumulated mileage of the vehicle. For example, mileage-responsive component 116 may be an odometer. In other embodiments, it may be a component configured to provide an accumulated time-temperature histogram, based on which a degree of LNT ageing may be estimated.

Controller 110 is shown operatively coupled also to service-registering component 118, and configured to receive an output therefrom. Service-registering component 118 may be any device configured to register when LNT 102 has been serviced in a manner that would restore all or part of its original capacity and/or activity. Such servicing may include replacing, cleaning, etching, and/or reapplying a catalyst wash coat, as examples. The service-registering component may be triggered automatically or manually (i.e., by a service technician), pursuant to LNT servicing. Thus, controller 110 may be configured to adjust the enrichment subinterval in response to an output of mileage-responsive component 116 and/or service-registering component 118. With access to an accumulated mileage of the vehicle and to when LNT 102 has undergone restorative servicing, the controller may determine an ageing characteristic of the LNT, and may base the enrichment subinterval at least partly on the ageing characteristic.

Controller 110 is shown in FIG. 1 to be operatively coupled to sensor 112 and configured to receive an output therefrom. Thus, it is provided that the enrichment subinterval may be adjusted in response to an output of the sensor. In some embodiments, the controller may be configured to adjust a start of the enrichment subinterval based on an output of the sensor. In particular, the controller may be configured to cause the engine to provide a lean exhaust to LNT 102, transition to providing a richer exhaust to the LNT, and continue providing the richer exhaust to the LNT during an enrichment subinterval starting after the sensor reports that the exhaust-stream air-fuel ratio has traversed the threshold. Further, in some examples, the controller may be configured so that the enrichment subinterval starts immediately or soon after (i.e., starting when) the threshold is traversed.

In other embodiments, controller 110 may be configured to adjust a duration and/or level of enrichment for the enrichment subinterval based on a response of sensor 112; the detailed manner in which the controller adjusts the duration and/or level of enrichment for the enrichment subinterval may depend on the particular embodiment that is practiced.

In one example, LNT ageing may be related to a delay in sensor 112 reporting an over-rich condition after it has already reported rich breakthrough. Thus, controller 110 may be configured to adjust the duration of the enrichment subinterval so that the enrichment subinterval continues until the sensor reports an over-rich condition. The over-rich condition may correspond to a minimum air-fuel ratio achieved after substantially all of the trapped oxidizing species are purged from LNT 102. Further, the over-rich condition may correspond to a minimum or maximum voltage output of the sensor, or to a near-minimum or near-maximum voltage output of the sensor, for example. Further still, the near-minimum or near-maximum voltage output used to indicate the over-rich condition may be selected pursuant to a calibration procedure. In this manner, the enrichment phase may be extended beyond the point where rich breakthrough occurs and may be stopped only when the sensor reports an over-rich condition. In other words, the enrichment subinterval may continue until the sensor traverses a second threshold which corresponds to a richer air-fuel ratio than does the first threshold.

In another example, LNT ageing may be related to a change in a $NO_x$ or other oxidant storage capacity of LNT 102. Controller 110 may be configured to integrate a response of the sensor with respect to time in order to estimate the storage capacity. The controller may be further configured to adjust the duration of the enrichment subinterval based on the integrated sensor response.

In another example, LNT ageing may be related to an untrapping rate (e.g., a release rate and/or reduction rate) of trapped $NO_x$ and/or other oxidizing species in LNT 102. Controller 110 may be configured to estimate the untrapping rate based on a response of the sensor in combination with a flow rate through the exhaust system (which, in turn, may be based on an engine speed, a throttle position, etc.). The controller may be further configured to adjust the duration of the enrichment subinterval based on the untrapping rate.

In still another example, LNT ageing may be related to overall LNT and/or SCR performance. Controller 110 may be coupled to an emissions-control diagnostic system of the vehicle and configured to adjust the duration of the enrichment subinterval in response to an emissions-control performance assay. The emissions-control performance assay may include, for example, measuring a tailpipe $NO_x$ level via an exhaust-stream $NO_x$ sensor. In one specific example, the controller may be configured to lengthen the enrichment subinterval if the tailpipe $NO_x$ level exceeds a threshold level and to shorten the enrichment subinterval if the tailpipe $NO_x$ level is below a threshold level.

Continuing in FIG. 1, the illustrated emissions-control system also includes temperature transducer 120 disposed within exhaust system 104. The temperature transducer may be any device responsive to exhaust-stream temperature. Although the temperature transducer is shown in the drawing as a separate, discrete device, it will be understood that the temperature transducer may be integrated into, or included within, another exhaust-system device. Thus, in one, non-limiting example, the temperature transducer may be included within sensor 112, as one or more accessible outputs of sensor 112 may be responsive to temperature. Thus, it is provided that the enrichment subinterval may be further responsive to a temperature of the exhaust stream and/or a temperature of a component disposed in the exhaust system (e.g., an LNT, an SCR device, etc.).

Figure 3:
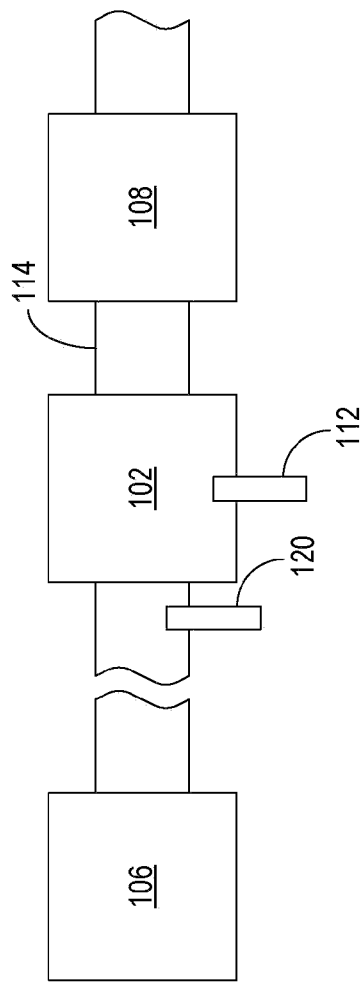
FIG. 3 represents a second example emissions-control system of a vehicle, in accordance with the present disclosure.

FIG. 3 represents an emissions-control system of a vehicle in a second, example embodiment. To avoid repetition, components of this and other embodiments that are substantially the same as those of FIG. 1 are omitted from subsequent drawings, or otherwise labeled with the same number and described no further. It will be understood, however, that like-numbered components identified in different embodiments of the present disclosure may also differ to some degree.

FIG. 3 illustrates sensor 112 disposed not in exhaust conduit 114, but within LNT 102. At this location, the sensor may be configured to undergo an output change based on a change in composition of the exhaust stream within the portion of the LNT that is upstream of the sensor. In this embodiment, sensor 112 may report a richness increase before the rich front has broken through the LNT, as rich exhaust sufficient to complete the reduction may be available downstream of engine 106 and upstream of sensor 112.

Figure 4:
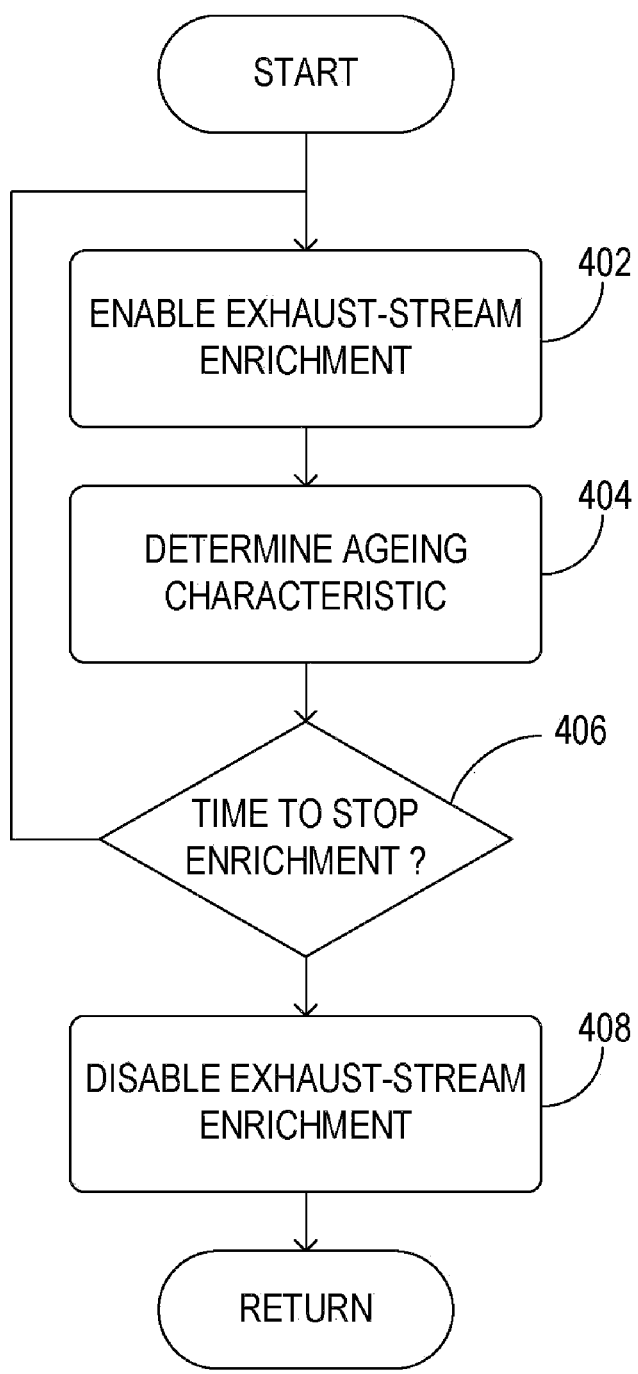
FIG. 4 illustrates an example method to provide ammonia to an SCR device disposed in an exhaust system of a vehicle, in accordance with the present disclosure.

FIG. 4 illustrates an example method to provide ammonia to an SCR device disposed in an exhaust system of a vehicle, wherein the SCR device is disposed downstream of an LNT. For ease of description, this embodiment is described presently with reference to aspects of FIG. 1. It will be understood, however, that the illustrated method may be enabled by various other configurations as well.

The method begins at 402, where enrichment of an exhaust stream from an engine of a vehicle is enabled. Enrichment of the exhaust stream may be enabled in various ways. For example, an intake air-fuel ratio of the engine may be enriched (e.g., more fuel provided relative to air). The intake air-fuel ratio may be enriched by modifying an intake-valve timing and/or a fuel-injector pulse width, by providing additional injections of fuel, by adjusting an EGR setting and/or an exhaust-valve timing, by throttling the air intake, etc. In other examples, the exhaust stream may be enriched by direct injection of fuel or another reductant into the exhaust stream. Enabling enrichment may include transitioning the combustion air-fuel ratio of the engine from a lean air-fuel ratio to a rich air-fuel ratio based on various factors: an amount of $NO_x$ stored in an exhaust system of the vehicle, a $NO_x$ level measured by a sensor disposed in the exhaust system, and/or various other factors.

The method continues to 404, where an ageing characteristic of an LNT disposed in the exhaust system is determined. The ageing characteristic may be a measured or predicted quantity or condition reflective of LNT ageing. Further, the ageing characteristic may be derived from a combination of measured or predicted quantities or conditions, as described herein.

In one embodiment, the ageing characteristic may be based at least partly on a mileage of the vehicle. For example, the ageing characteristic may increase with vehicle mileage. In another example, the ageing characteristic may be based on vehicle mileage, but subject to a reset when the LNT is replaced or otherwise serviced. In this example, replacement or other servicing of the LNT may be detected via a service-registering component (e.g., service-registering component 118), and the ageing characteristic may be reset as appropriate. Afterwards, the ageing characteristic may be based at least partly on a mileage accumulated subsequent to the reset.

In another embodiment, the ageing characteristic may be based on the amount of time it takes for a sensor disposed in the exhaust stream of the vehicle and upstream of the SCR device (e.g., sensor 112) to transition from a level corresponding to rich breakthrough to a level corresponding to an over-rich condition, i.e., to an extreme or near-extreme output of the sensor.

In another embodiment, the ageing characteristic may be based on changes in $NO_x$ storage capacity and/or oxygen storage capacity of the LNT, which may be determined, for example, via a controller operatively coupled to one or more sensors disposed in the exhaust system of the vehicle (e.g., controller 110 operatively coupled to sensor 112). In one specific example, the controller may estimate the $NO_x$ storage capacity and/or oxygen storage capacity by integrating a response of the sensor with respect to time.

In another embodiment, the ageing characteristic may be based on an untrapping rate of trapped $NO_x$ and/or other oxidizing species from LNT 102 (vide supra), which may be determined, for example, via a controller operatively coupled to one or more sensors disposed in the exhaust system of the vehicle. In one specific example, the controller may estimate the untrapping and/or reduction rate of trapped $NO_x$ based on a response of the sensor and further based on a flow rate through the exhaust system (which, in turn, may be based on an engine speed, a throttle position, etc.).

In still other embodiments, the aging characteristic may be based on a determination of LNT and/or SCR performance, which may be assayed via an emissions-control diagnostic system of the vehicle. In one specific example, the emissions-control diagnostic system may include an exhaust-stream $NO_x$ sensor or other device responsive to a tailpipe $NO_x$ level. The controller may be configured to correlate the tailpipe $NO_x$ level to LNT ageing via an appropriate heuristic.

The method continues to 406, where it is determined whether it is time to stop enrichment and to return to lean operation. To this end, controller 110 may compute an enrichment subinterval based on the ageing characteristic determined at 404.

In one embodiment, the enrichment phase may coincide with the enrichment subinterval: enrichment may begin at the start of the enrichment subinterval and stop at the end of the enrichment subinterval. Thus, the controller may compare the time into the current enrichment phase to the length of the enrichment subinterval, and determine that it is time to stop enrichment if the time into the current enrichment phase exceeds the length of the enrichment subinterval. In another embodiment, the enrichment subinterval may start some time after enrichment has already begun, e.g., when a sensor disposed in the exhaust system responds in a particular way. In one, non-limiting example, controller 110 may wait until sensor 112 reports rich breakthrough; it may then compare the time since the rich breakthrough was reported to the length of the enrichment subinterval, and stop enrichment if such time exceeds the length of the enrichment subinterval. In these embodiments, the enrichment subinterval may bracket a latter part of the enrichment phase.

In some embodiments, the enrichment subinterval may be further based on exhaust-stream temperature. The inventor herein has recognized that low-temperature, copper-based SCR catalysts may oxidize ammonia to $NO_x$ at relatively high temperatures, thereby reducing the emissions-control gains of including both an LNT and an SCR device in the exhaust system. Therefore, the method may further include shortening the enrichment subinterval to limit the amount of ammonia provided to the copper-based SCR device when the temperature of the exhaust stream is above a threshold temperature. The enrichment subinterval may be shortened as the temperature of the SCR device increases, for example, and further adjusted in response to catalyst aging as noted herein.

Enrichment of the exhaust stream may continue until it is determined that it is time to stop enrichment, i.e., at the end of the enrichment subinterval. When it is determined that it is time to stop enrichment, execution of the method continues to 408, where enrichment is disabled. The enrichment may be disabled by reversing whatever action was taken to provide enrichment at 402: restoring an intake-valve timing, fuel-injector pulse width, EGR setting, exhaust-valve timing, disabling the air throttle, etc., as appropriate for lean conditions. Thus, an ageing characteristic of the LNT may be determined, and enrichment of the exhaust flow may be disabled at a time that depends on the ageing characteristic. Further, the enrichment subinterval may be responsive to an ageing of the LNT, and more specifically, the enrichment subinterval may be lengthened or the level of enrichment may be increased as the LNT becomes further aged.

Figure 5:
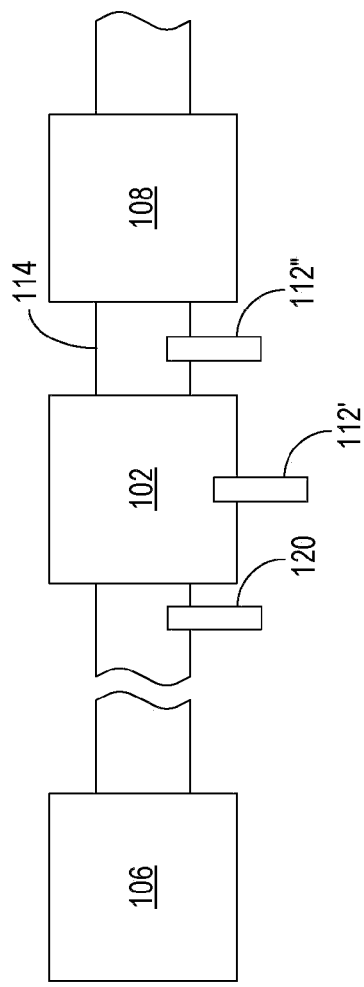
FIG. 5 represents a third example emissions-control system of a vehicle, in accordance with the present disclosure.

FIG. 5 represents an emissions-control system of a vehicle in another, example embodiment. The emissions-control system of FIG. 5 includes upstream sensor 112' disposed within LNT 102, and downstream sensor 112" disposed downstream of LNT 102 but upstream of SCR device 108. Each of the upstream sensor and the downstream sensor may be substantially the same or at least partly different than sensor 112 described above. In one embodiment, upstream sensor 112' may be a UEGO sensor, and downstream sensor 112" may be either of a HEGO sensor or a UEGO sensor.

Figure 6:
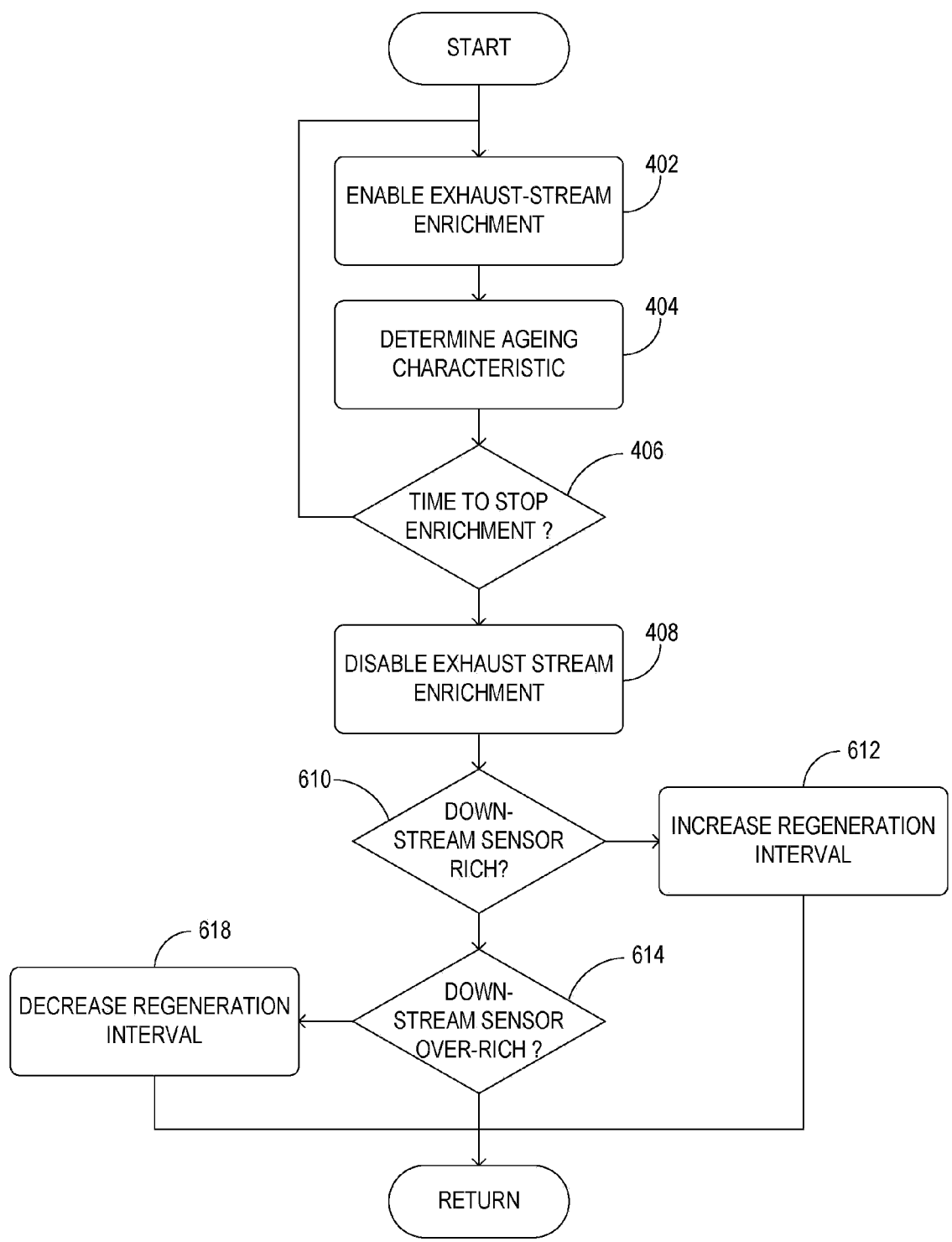
FIG. 6 illustrates a second example method to provide ammonia to an SCR device disposed in an exhaust system of a vehicle, in accordance with the present disclosure.

FIG. 6 illustrates an example method for providing ammonia to an SCR device disposed in an exhaust system of a vehicle, the SCR disposed downstream of an LNT, and the exhaust system comprising both an upstream sensor and a downstream sensor. Steps in the method of FIG. 6 that are substantially the same as those of FIG. 4 are labeled with the same number and described no further. It will be understood, however, that like-numbered steps identified in different embodiments of the present disclosure may also differ to some degree. For ease of description, this embodiment is described presently with reference to aspects of FIG. 5. It will be understood, however, that the illustrated method may be enabled by various other configurations as well.

The method begins at 402, where exhaust-stream enrichment is enabled; it continues to 404, where an ageing characteristic of the LNT is determined, to 406, where it is determined whether it is time to stop enrichment, and to 408, where exhaust-stream enrichment is stopped. In this embodiment, the sensor that is used in 406 to determine when rich breakthrough has occurred may be upstream sensor 112' of FIG. 5. Thus, the start of the enrichment subinterval may be adjusted based on an output of the upstream sensor.

At 610, it is determined whether downstream sensor 112" is reporting a rich condition. If the downstream sensor is not reporting a rich condition, then at 612, a positive increment may be applied to lengthen the enrichment subinterval. By applying the positive increment, subsequent exhaust-stream enrichment phases may be extended in duration. But, if the downstream sensor is reporting a rich condition, then at 614, it is determined whether the downstream sensor is reporting an over-rich condition. If it is determined that the downstream sensor is reporting an over-rich condition, then at 618, a negative increment may be applied to shorten the enrichment subinterval. By applying the negative increment, subsequent exhaust-stream enrichment phases may be reduced in duration. The method then returns, irrespective of the output of the downstream sensor.

In the manner described above, the enrichment subinterval may be lengthened if an output of the downstream sensor is below a first threshold, and shortened if the output of the downstream sensor is above a second threshold, different than the first threshold, in the example where the air-fuel ratio is indicated by a HEGO/UEGO sensor. Further, the output of the downstream sensor may be responsive to a partial pressure of dioxygen, with the first threshold corresponding to a greater partial pressure of dioxygen than the second threshold. Thus, the controller may be configured to lengthen the enrichment subinterval if an air-to-fuel ratio indicated by the downstream sensor is below a first threshold, and to shorten the enrichment subinterval if the air-to-fuel ratio indicated by the downstream sensor is above a second threshold, corresponding to a richer air-to-fuel ratio than the first threshold.

Figure 7:
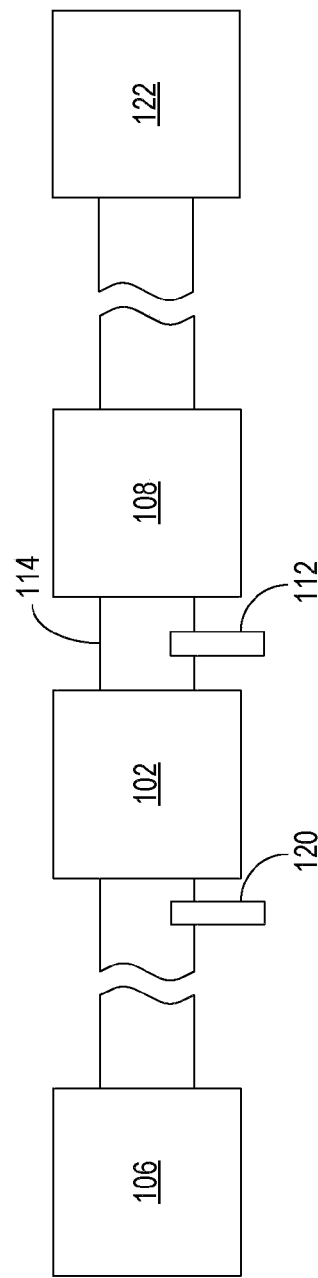
FIG. 7 represents a fourth example emissions-control system of a vehicle, in accordance with the present disclosure.

FIG. 7 represents an emissions-control system of a vehicle in another, example embodiment. The emissions-control system of FIG. 7 further includes downstream LNT 122, disposed downstream of SCR 108. The downstream LNT is provided in order to limit hydrocarbon and carbon monoxide slip from the upstream-LNT/SCR combination, by providing a further opportunity for these gases to combine with adsorbed $NO_x$. In yet another embodiment, an additional sensor may be disposed downstream of the downstream LNT to provide adaptive control over the enrichment subinterval, substantially as described in the foregoing embodiments.

In this example, however, rich breakthrough from downstream LNT 122 is not desired, as there is no SCR stage downstream of the LNT 122 that can use ammonia to reduce $NO_x$. Therefore, a sensor downstream of the downstream LNT may be used to prevent rich breakthrough from the downstream LNT. Moreover, as shown in previous embodiments, the downstream sensor may be disposed within the downstream LNT.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in a control system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. An emissions-control system of a vehicle coupled to an engine of the vehicle and comprising:
   an LNT disposed in an exhaust system of the vehicle, downstream of the engine;
   an SCR device disposed in the exhaust system of the vehicle, downstream of the LNT;
   a controller operatively coupled to the engine, configured to cause the engine to provide a reducing exhaust to the LNT during an enrichment interval, the enrichment interval including an enrichment subinterval, the controller further configured to adjust the enrichment subinterval in response to an aging of the LNT;
   an upstream sensor disposed within the LNT, wherein the controller is configured to adjust a start of the enrichment subinterval based on an output of the upstream sensor and is further configured to adjust a level of enrichment of the enrichment subinterval based on aging of the LNT; and
   a downstream sensor disposed in the exhaust system downstream of the LNT and upstream of the SCR, wherein the controller is further configured to lengthen the enrichment subinterval if an output of the downstream sensor is below a first threshold, and to shorten the enrichment subinterval if the output of the downstream sensor is above a second threshold, different than the first threshold.

2. The emissions-control system of claim 1, wherein the controller is configured to adjust a duration of the enrichment subinterval based on an output of the sensors.

3. The emissions-control system of claim 1, wherein each sensor is responsive to a partial pressure of dioxygen in the exhaust system, in a locality of the sensor.

4. The emissions-control system of claim 1, wherein the controller is further configured to lengthen the enrichment subinterval if an air-to-fuel ratio indicated by the downstream sensor is below a first threshold, and to shorten the enrichment subinterval if the air-to-fuel ratio indicated by the downstream sensor is above a second threshold, corresponding to a richer air-to-fuel ratio than the first threshold.

5. The emissions-control system of claim 1, wherein the LNT is an upstream LNT, and further comprising a downstream LNT disposed in the exhaust system, downstream of the SCR device.

* * * * *